A. S. HOWELL.
FILM ACTUATING SHUTTLE AND TEETH.
APPLICATION FILED FEB. 13, 1915.
1,238,520.
Patented Aug. 28, 1917.
4 SHEETS—SHEET 1.
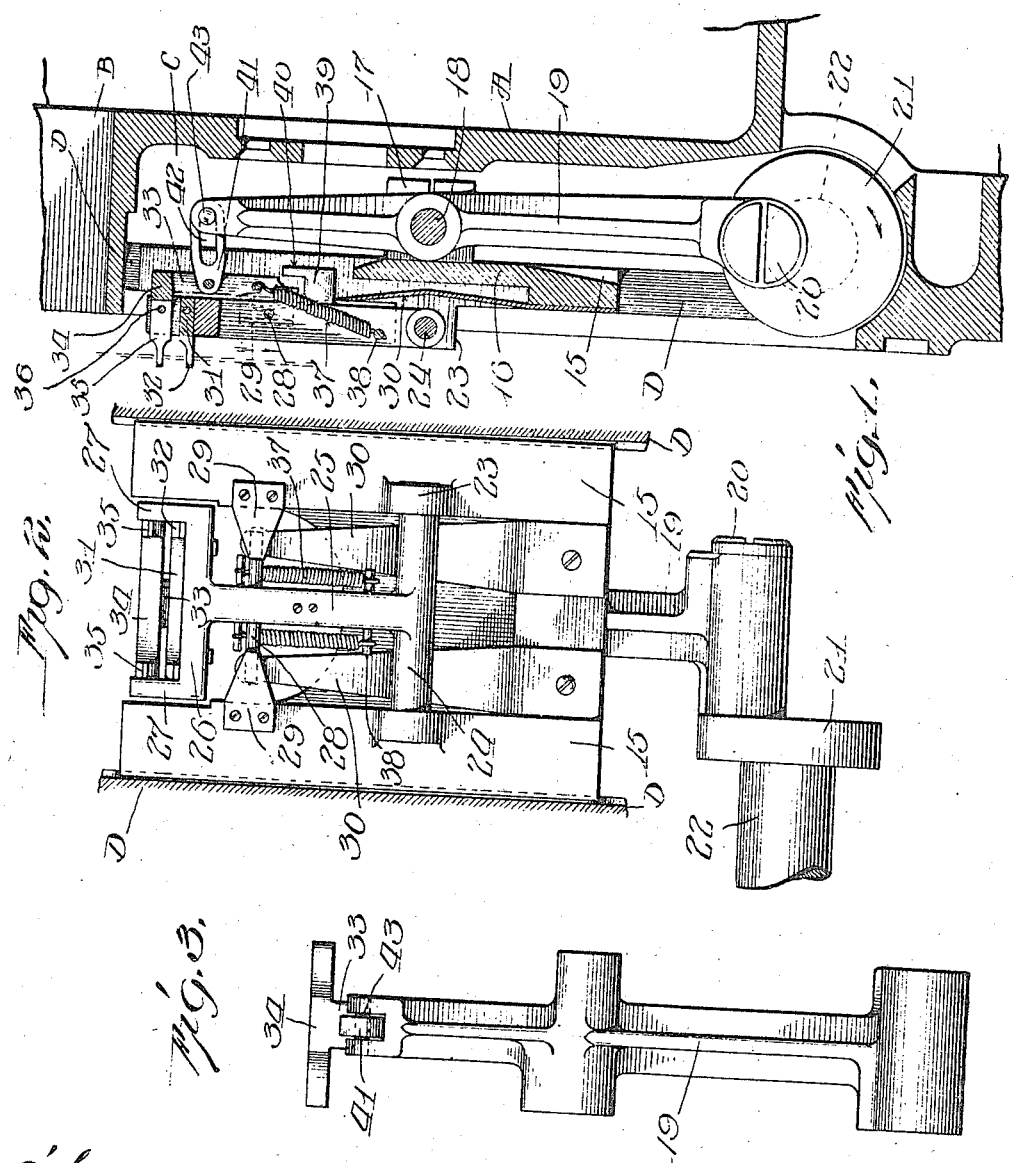

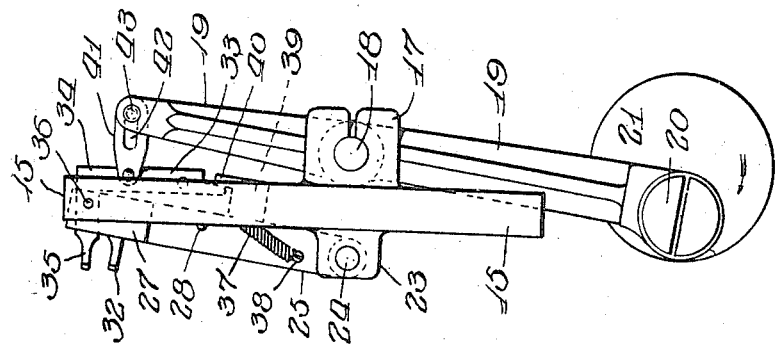
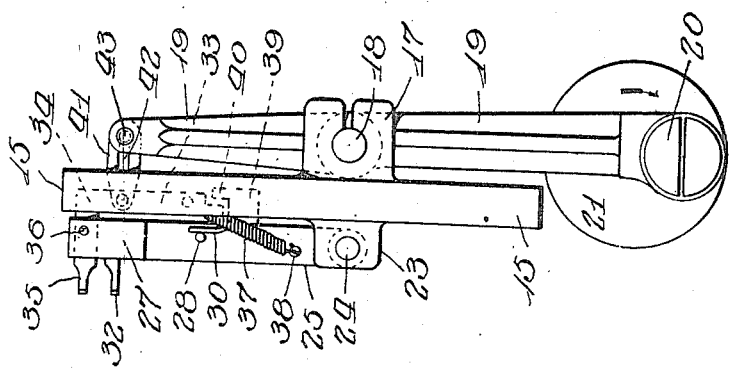
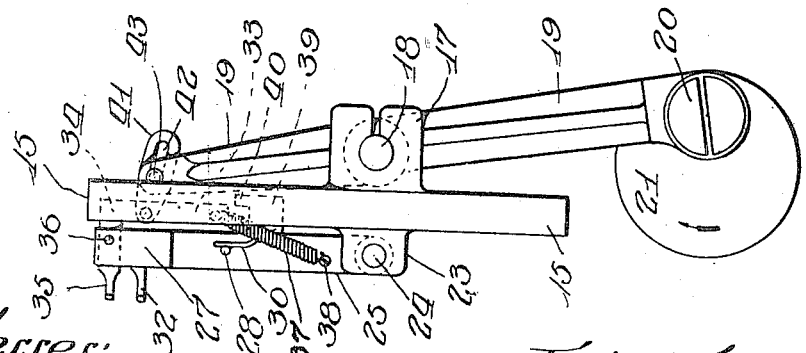

A. S. HOWELL.
FILM ACTUATING SHUTTLE AND TEETH.
APPLICATION FILED FEB. 13, 1915.

1,238,520.

Patented Aug. 28, 1917.
4 SHEETS—SHEET 3.

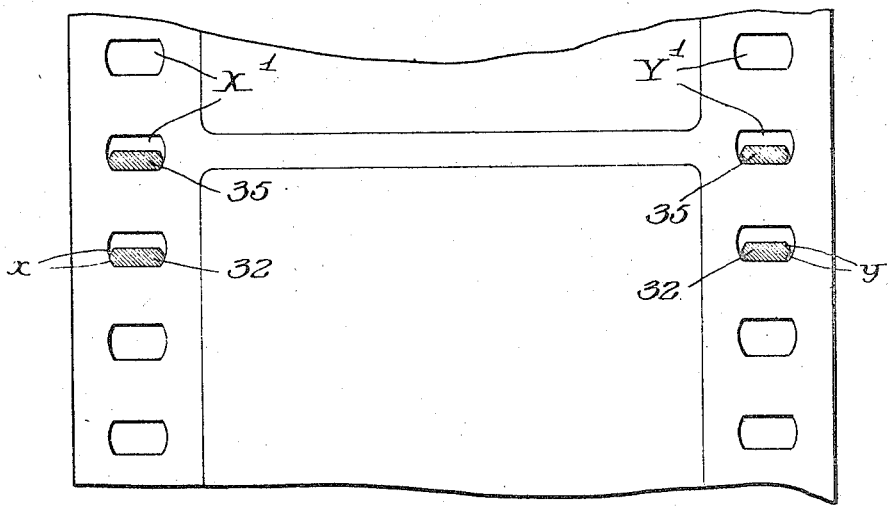
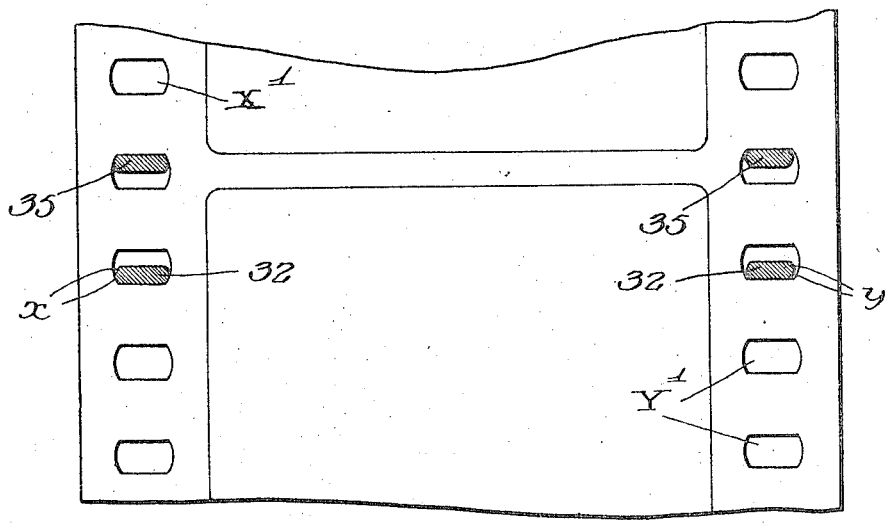

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

FILM-ACTUATING SHUTTLE AND TEETH.

1,238,520.  Specification of Letters Patent.  Patented Aug. 28, 1917.

Application filed February 13, 1915. Serial No. 7,931.

*To all whom it may concern:*

Be it known that I, ALBERT S. HOWELL, a citizen of the United States, and resident of Chicago, in the county of Cook and State of Illinois, have invented certain new and useful Improvements in Film-Actuating Shuttles and Teeth, of which the following is a full, clear, and exact specification.

My present invention relates to cinematographic apparatus and more particularly to the actuating shuttle and teeth for moving a film of ribbon past an aperture for the purpose of taking, printing or projecting a series of views.

The primary object of my present invention is the provision of suitable novel means for registering or forming the film in front of an aperture, and for moving said film past said aperture. Another object is the provision of means adapted to grasp the film firmly during its movement. Another object of my invention is to provide mechanism for securing a registry of the perforations of superimposed or parallel films when my film moving mechanism is employed in a printing machine. Still other objects of my invention are the provision of a film actuating mechanism that is effective and accurate in its operation, easy to manipulate and constructed of a minimum number of parts.

The above and other objects I prefer to accomplish by the means and in the manner hereinafter fully described and as more particularly pointed out in the claims, reference being had to the accompanying drawings, forming a part of this specification, in which, Figure 1 is a vertical elevation of my invention, a portion of the shuttle and teeth being shown in central transverse section to better disclose the location and construction of the parts.

Fig. 2 is a front elevation of my invention detached from the machine.

Fig. 3 is a detail elevation of the shuttle actuating lever and one of the frames for carrying the picks or teeth.

Figs. 4, 5 and 6 are side elevations of my invention shown somewhat diagrammatically to illustrate three successive steps in the movement of the shuttle and picks or teeth.

Fig. 9 is an enlarged view of a standard perforated film showing the relative positions of the picks or teeth in engagement therewith prior to the separating of the latter, and Fig. 10 is a similar view showing the relative positions of the picks or teeth after separation for the purpose of securing registry through the control of the margin of the film by the teeth.

Figure 7:
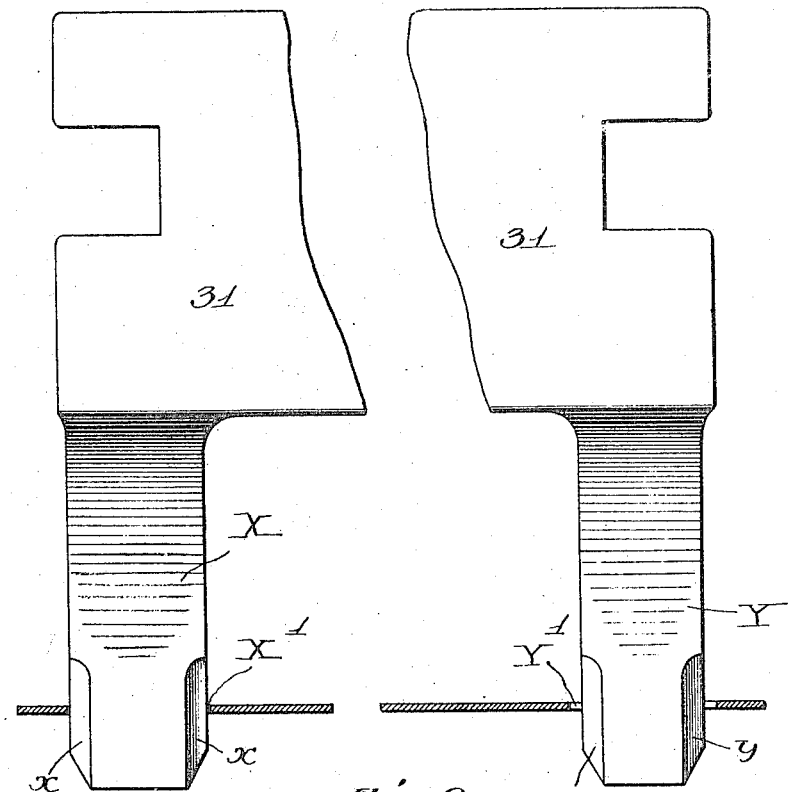
Fig. 7 is a plan view of the picks or teeth removed from the machine and drawn to a greatly enlarged scale to illustrate their construction and manner of engagement with the film perforations for the purpose of marginal control.

In the drawings, similar reference characters indicate the same parts throughout the various views, and for the purpose of clearness all parts of the apparatus to which my invention is applied have been omitted excepting the front wall A thereof and the aperture B therein past which the film is adapted to be moved intermittently.

Preferably below the aperture is a recess or chamber C in which my invention is mounted and the sides of said compartment are provided with vertically disposed channels or grooves D that provide guideways for the shuttle.

The shuttle comprises a substantially rectangular frame the vertically disposed side members 15 of which are arranged parallel with each other and extend into and are reciprocated in said guide ways D. A back plate 16 connects the side members 15 and is provided with laterally disposed rearwardly extended bearing bases 17 for journaling a transverse rock shaft 18 upon which a pitman 19 is pivotally mounted intermediate its ends. The lower end of pitman 19 extends to and is secured upon a crank-pin 20 projecting from one of the faces of a continuously rotatable cam or disk 21 carried by the adjacent end of a drive-shaft 22 that is journaled in horizontal bearings in the walls A. From the above it will be seen that the continuous rotation of disk 21 will reciprocate the shuttle frame 15—16 vertically in its guideways, at the same time imparting a rocking motion to the end of the pitman above its pivot.

Alining bearing lugs 23, 23, project from the outer faces of the shuttle side members 15 to provide journals for a horizontally disposed rock shaft 24 that is provided intermediate its ends with a vertically disposed arm 25. The upper portion of this arm 25 is substantially T-shaped and the ends of the horizontal cross-piece 26 thereof have short parallel fingers 27, 27, extended vertically therefrom adjacent the facing edges of the side members 15 of the shuttle frame. A cross pin 28 is inserted transversely through arm 25 and rigidly retained therein in a horizontal plane below and parallel with the cross piece 26 and is so disposed that its ends are adapted to contact the adjacent ends of lateral stops 29, 29, projecting inwardly toward each other from the contiguous side members 15. A shallow recess or depression is formed in the shuttle frame between the side members for the seating and securing of a pair of flat leaf springs 30, the upper portion of which springs extend to and bear against the cross pin 28 to keep the same normally pressed toward the stops 29.

Secured in any suitable manner upon the upper surface of cross piece 26 is a horizontally disposed elongated plate 31, the ends of which terminate adjacent the vertical fingers 27 where said plate is provided with outwardly projecting horizontally disposed parallel teeth or picks 32 that are so constructed and arranged that, when the arm 25 is in the position shown in Fig. 1 of the drawings, said teeth will enter perforations upon the opposite edges of the film.

Above the plate 31 and between the fingers 27 is mounted a coöperating tooth or pick carrier that comprises a substantially T-shaped lever the vertical arm 33 of which is disposed to the rear of the arm 25 and the cross piece 34 of which is disposed in a horizontal plane and provided with parallel teeth or picks 35, 35, that preferably extend forwardly between and adjacent to fingers 27 to about the same vertical plane as the lower set of teeth 32 above mentioned. This lever is mounted upon a pin 36 that passes transversely through the fingers 27 and through said teeth 35 so as to permit the pivotal movement of said lever thereon. Adjacent its lower end the vertical arm 33 of the lever is connected to the upper end of coiled contraction springs 37 the opposite ends of which springs are connected to a transverse pin 38 secured through the arm 25 adjacent its lower end. The tendency of springs 37 is to pull the lower end of the vertical arm 33 of the lever toward and in contact with arm 25 and in order to limit the opposite movement of said arm 33 I provide a substantially L-shaped stop 39 upon the arm 35, the upturned inner end 40 of which is disposed in the path of movement of the lower end of said arm 33.

Intermediate its ends arm 33 has a relatively short link 41 pivoted thereon at one end, the opposite end of said link being provided with a longitudinally disposed slot 42 that is engaged by a transverse pin 43 carried by the upper end of shuttle operating pitman 19. This construction permits the pitman 19 to have a sliding movement with relation to said link before actuating the latter and when the pin 43 carried by said lever reaches the end of the slot farther from the picks it will pull the link thereby moving the arm until the lower end of the latter engages the upturned end 40 of the stop 39. This causes the member 34 to rock upon the pin 36 and the teeth or picks 36, 36 to be moved toward the teeth or picks 32, for the purpose of disengaging the same from the film when the teeth are to be withdrawn. The continued rearward motion or pull on the upper end of the pitman 19 is adapted to bodily move the upper end of the arm 25 from the film upon its pivot or rock shaft 24 and thereby withdraw the teeth from the film perforations as indicated clearly in Fig. 6 of the drawings. Further rotation of the cam or disk 21 is adapted through the medium of the crank pin 20, to move the pitman 19 bodily in a vertical direction, and as the journals of said pitman are mounted upon the shuttle frame members said shuttle frame is reciprocated bodily in the guideways D. When said disk 21 is rotated in the direction indicated by the arrows, the movement of the shuttle frame succeeding the withdrawal of the teeth is upward until the pin 20 reaches its highest point. At the center of the upward journey the upper end of the lever 19 commences to move toward the film. In its journey forward the arm 25 is moved through the action of the springs 30 until the picks 32 and 35 have entered adjacent perforations in either side of the film. The continued movement toward the film of the upper end of pitman 19 permits the springs 37 to pull the lower end of the arm 33 toward the film which causes the teeth 35 to rock on the pivot 36 and thereby separate from the teeth 32 which forces the teeth 32 and 35 adjacent opposite sides of adjacent perforations thereby causing the film to accurately register with the aperture B, when superimposed films are used as in a printing machine secures an accurate registration in the respective films.

The slot 42 permits a further forward movement of the upper end of the lever 19, while the shuttle is completing its downward journey without disturbing the relation of the teeth 32 and 35.

In the course of developing and drying of a film after printing there is a minute longitudinal and transverse shrinkage. This shrinkage with respect to a single perforation, or adjacent perforation on the same side of the film is negligible, but the shrinkage between opposite perforations and between perforations separated from each other upon the same side must be taken into account.

Figure 8:
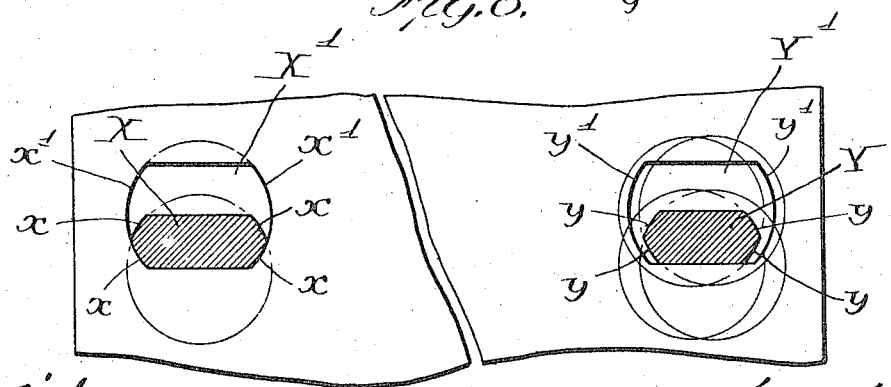
Fig. 8 is an enlarged view of a fragment of standard perforated film illustrating the manner of constructing the perforations therein and the manner of constructing the picks or teeth in transverse section.

In order to take care of this inherent feature I prefer to construct the teeth or picks of a transverse contour substantially as shown in Figs. 7 to 10 of the drawings, wherein it will be observed one of the teeth, designated as X, has its top and bottom edges flat and parallel to engage the top and bottom edges of the perforation while its side edges are chamfered at $x$ to tightly fit the curvature of the sides $x^1$ of the perforations $X^1$ either at the top or bottom thereof. The opposite tooth Y engaging the perforation $Y^1$ upon the opposite longitudinal edge of the film, is slightly less in width than tooth X, to accommodate the transverse shrinkage above referred to, and is chamfered at its sides $y$ to correspond with the curvature of the sides $y^1$ of the perforations engaged thereby. Both teeth are preferably as thick vertically as one-half the height of the perforations in order to permit of the easy insertion of the teeth and of the relative movement of the teeth in the manner hereinbefore described. It appears from the foregoing that the separation of the teeth as heretofore described will secure an accurate transverse relation betwen the perforations and the aperture B and that the snugly fitting teeth X will secure a dependable longitudinal relation between the film and the aperture B while the somewhat smaller teeth Y will take care of the transverse shrinkage in developed film. It will also be apparent that the teeth or picks herein described may be used equally well with undeveloped film in which no shrinkage has occurred or with a developed and an undeveloped film superimposed as is necessary in a printing machine.

While I have herein disclosed and illustrated certain specific means for carrying out my invention it of course will be obvious to others skilled in the art that numerous modifications or refinements thereof are possible without materially departing from the spirit of my invention. I therefore, desire it understood that all such changes are contemplated within the scope of my invention as expressed in the appended claims. I also desire it understood that the principles and construction herein disclosed are equally applicable to any type of machine in which a ribbon of perforated film is used, whether for the taking of the pictures (as with a cinematograph camera), the printing of the positive from the negative film, or the projection of the positive film, and I therefore do not limit myself to any particular type of such apparatus.

Having described my invention, what I claim as new and desire to secure by Letters Patent is:

1. In mechanism for moving perforated film, a reciprocable shuttle, a pair of teeth carried thereby and movable relatively to each other, and means for reciprocating said shuttle and moving said teeth relative to each other and into and out of engagement with the perforations of said film.

2. In mechanism for moving perforated film, a reciprocable member, a pair of teeth carried thereby adapted to enter the perforations of a film, means for reciprocating said member and devices for changing the relative distance between said teeth.

3. In mechanism for moving perforated film a reciprocable shuttle, teeth adapted to be moved into and out of engagement with the perforations of a film, a device pivotally carried by said shuttle upon which said teeth are mounted, one of said teeth being movable independently of said device, and means for moving said device relative to said shuttle and for reciprocating the latter.

4. In mechanism for moving perforated film a reciprocable shuttle and means for actuating the same, teeth carried by said shuttle and adapted to be moved into and out of engagement with the perforations of a film, and devices connecting said teeth and shuttle actuating means for moving said teeth relatively to said shuttle and adapted to move one of said teeth independently of said device.

5. In mechanism for moving perforated film a reciprocable shuttle and means for actuating the same, an arm pivoted on and carried by said shuttle, teeth mounted on said arm and movable therewith into and out of engagement with the perforations of a film, and devices connecting said arm and teeth to said shuttle actuating means for moving the same.

6. In mechanism for moving perforated film, a reciprocable shuttle, an arm pivotally carried thereby, independently movable sets of teeth mounted on said arm, and means for reciprocating said shuttle that is adapted to move said arm toward and away from a film at predetermined intervals.

7. In mechanism for moving perforated film, a reciprocable shuttle, a vibratory arm pivotally carried thereby, teeth mounted on said arm and movable into and out of engagement with the perforation of a film, and a bodily movable pitman journaled on said shuttle and adapted to actuate said arm.

8. In mechanism for moving perforated film, a reciprocable shuttle, a vibratory arm pivotally carried thereby, teeth mounted on said arm and movable into and out of engagement with the perforation of a film, a bodily movable pitman journaled on and movable with said shuttle, and means connecting said pitman to said arm whereby the latter is reciprocated by said pitman independent of said shuttle.

9. In mechanism for moving perforated film, a reciprocable shuttle, a vibratory arm pivotally carried thereby, teeth mounted on said arm and movable into and out of engagement with the perforation of a film, a bodily movable pitman journaled on said shuttle and adapted to actuate said arm, and devices for imparting a vibratory motion to said pitman and bodily reciprocating the same simultaneously with said shuttle.

10. In mechanism for moving perforated film, a reciprocable shuttle, a member pivoted at one end thereon, a tooth mounted on said member and stationary relative thereto, a second tooth pivotally mounted on said member and capable of movement independent thereof, and actuating elements including a vibratory device pivotally mounted on said shuttle for reciprocating the latter and one end of which is connected to and adapted to actuate said arm and pivoted tooth.

11. In mechanism for moving perforated film, a reciprocable shuttle, a member pivoted at one end thereon, a tooth mounted on said member and stationary relative thereto, a second tooth pivotally mounted on said member and capable of movement independent thereof, and actuating elements including a pitman fulcrumed intermediate its ends on said shuttle for reciprocating the latter and one end of which is connected to and adapted to actuate said arm and pivoted tooth.

12. In mechanism for moving perforated film, a reciprocable shuttle, a member pivoted at one end thereon, a tooth mounted on said member and stationary relative thereto, a second tooth pivotally mounted on said member and capable of movement independent thereof, a vibratory device pivotally mounted on and carried by said shuttle for reciprocating the latter and one end of which is connected to and adapted to actuate said arm and pivoted tooth, and means for vibrating said device consisting of a rotatable disk to which said device is eccentrically connected.

13. In mechanism for moving perforated film, a reciprocable shuttle, a member pivoted at one end thereon, a set of horizontally alining teeth mounted on said member and stationary relative thereto, a second set of horizontally alining teeth pivotally mounted on said member and capable of movement independent thereof, a vibratory device pivotally mounted on said shuttle for reciprocating the latter and one end of which is connected to and adapted to actuate said arm and pivoted teeth, and means for vibrating said device.

14. In mechanism for moving perforated film, a reciprocable shuttle, a member pivoted at one end thereon, a set of horizontally alining teeth mounted on said member and stationary relative thereto, a second set of horizontally alining teeth pivotally mounted on said member and capable of movement independent thereof, a vibratory device pivotally mounted on said shuttle for reciprocating the latter and one end of which is connected to and adapted to actuate said arm and pivoted teeth, and means for vibrating said device consisting of a rotatable disk to which said device is eccentrically connected.

15. In mechanism for moving perforated film, a reciprocable shuttle, a vertically disposed vibratory pitman journaled thereon and bodily movable therewith, a crank engaging the lower end of said pitman adapted to vibrate the latter and simultaneously raise and lower the same, a tooth bearing arm pivoted on and carried by said shuttle and movable toward and away from the film, upper and lower teeth mounted on said arm, and means connecting one of said teeth to the adjacent end of said pitman whereby the vibratory motion of the latter causes one of said teeth to move away from its companion tooth after entering the perforated film and to move toward said companion tooth prior to their withdrawal from said film.

16. A mechanism for moving perforated film, a reciprocable shutter, a vertically disposed vibratory pitman journaled thereon and bodily movable therewith, a crank engaging the lower end of said pitman adapted to vibrate the latter and simultaneously raise and lower the same, a tooth bearing arm pivoted on and carried by said shuttle and movable toward and away from the film, upper and lower vertically alining sets of teeth mounted on said arm, and means connecting one of said sets of teeth to the adjacent end of said pitman whereby the vibratory motion of the latter causes one of said sets of teeth to move away from its companion sets of teeth after entering the perforated film and to move toward said companion sets of teeth prior to their withdrawal from said film.

17. In mechanism for moving perforated film, a reciprocable shuttle, a vertically disposed vibratory pitman journaled thereon and bodily movable therewith, a crank engaging the lower end of said pitman adapted to vibrate the latter and raise and lower the same, an arm on said shuttle pivoted to move transversely thereto toward and away from the film, a tooth mounted on and movable with said arm, a second tooth pivoted on said arm and capable of independent movement upon its pivot, and a link connecting said pivoted tooth to the adjacent portion of said pitman.

18. In mechanism for moving perforated film, a reciprocable shuttle, a vertically disposed vibratory pitman journaled thereon and bodily movable therewith, a crank engaging the lower end of said pitman adapted to vibrate the latter and raise and lower the same, an arm on said shuttle pivoted to move transversely thereto toward and away from the film, a tooth mounted on and movable with said arm, a second tooth pivoted on said arm and capable of independent movement upon its pivot, and a link connected at one end to said pivoted tooth and having a slotted connection at its opposite end with said pitman.

19. In mechanism for moving perforated film, a reciprocable shuttle, a vertically disposed vibratory pitman journaled thereon and bodily movable therewith, a crank engaging the lower end of said pitman adapted to vibrate the latter and raise and lower the same, an arm on said shuttle pivoted to move transversely thereto toward and away from the film, a set of teeth mounted on and movable with said arm, a second set of teeth vertically alining with said first set of teeth and pivotally mounted upon said arm so as to be moved independent thereof, and a link connecting the set of pivoted teeth to the adjacent portion of said pitman.

20. In mechanism for moving perforated film, a reciprocable shuttle, a vertically disposed vibratory pitman journaled thereon and bodily movable therewith, a crank engaging the lower end of said pitman adapted to vibrate the latter and raise and lower the same, an arm on said shuttle pivoted to move transversely thereto toward and away from the film, a set of teeth mounted on and movable with said arm, a second set of teeth vertically alining with said first set of teeth and pivotally mounted upon said arm so as to be moved independent thereof, and a link connected at one end to the set of pivoted teeth and having a slotted connection at its opposite end with said pitman.

21. In mechanism of the character described a suitable support, teeth mounted thereon adapted to enter separate perforations in a film and means adapted to move one of said teeth away from the other after entering said perforations.

22. In mechanism of the character described a suitable support, two sets of teeth mounted thereon adapted to enter separate perforations in a film and means adapted to move one of said sets of teeth away from the other set after entering said perforations and means for actuating said teeth.

23. In mechanism of the character described a suitable support, two pairs of vertically and horizontally alining teeth mounted thereon adapted to enter separate perforations in opposite margins of a film, and one of said sets of teeth adapted to be moved away from the opposite set of teeth after entering said perforations and means for actuating said movable teeth.

24. In mechanism of the character described a suitable support, vertically alining teeth mounted thereon adapted to enter marginal perforations in a film, the lower tooth being relatively stationary and the upper tooth adapted to be moved away from the lower tooth after entering said perforations and means for actuating said upper tooth.

25. In mechanism of the character described a suitable support, upper and lower pairs of teeth mounted thereon adapted to enter separate perforations in a film, said upper pair of teeth adapted to be moved away from said lower set of teeth after entering said perforations and means for actuating said upper teeth.

26. In mechanism of the character described a suitable support, upper and lower vertically alining pairs of teeth mounted thereon adapted to enter separate perforations in opposite margins of a film, said upper pair of teeth adapted to be moved bodily away from said lower set of teeth after entering said perforations and means for actuating said upper teeth.

27. In mechanism of the character described a suitable support, an upper and a lower tooth mounted thereon adapted to enter perforations in a film, the lower tooth adapted to approximately engage the lower edge of its respective perforation and the upper tooth adapted to be moved to engage the upper edge of its respective perforation after entering the same and means for actuating said upper tooth.

28. In mechanism of the character described a suitable support, teeth mounted thereon adapted to enter separate perforations in a film, some of said teeth being adapted to be moved away from said remaining teeth after entering said perforations and to be moved toward each other prior to withdrawal from said perforations and means for actuating said teeth.

29. In mechanism of the character described a suitable support, an upper and a lower tooth mounted thereon adapted to enter separate perforations in the margin of a film, one of said teeth adapted to be moved away from the other tooth after entering said perforations, and to be moved toward said other tooth prior to withdrawal from said perforations and means for actuating said movable tooth.

30. In mechanism of the character described a suitable support, upper and lower sets of vertically alining teeth mounted thereon, and means for moving said upper set of teeth away from said lower set of teeth after entering said perforations, and for moving said upper set of teeth toward said lower set of teeth prior to withdrawal from said perforations.

31. In mechanism for moving film provided with perforations upon its longitudinal edges, a reciprocable shuttle provided with two oppositely arranged teeth adapted to engage opposite perforations in the respective margins of the film and capable of movement independently of their movement with said shuttle, one of said teeth being adapted to snugly fit transversely its respective perforation and the other of said teeth being of smaller sectional dimensions to accommodate shrinkage in the film and actuating means for said shuttle and teeth.

32. In mechanism for moving film provided with perforations upon its longitudinal edges, a shuttle provided with oppositely arranged pairs of teeth adapted to engage opposite perforations in the respective margins of the film, one of said pairs of teeth being adapted to snugly fit transversely their respective perforations, and the other of said pairs of teeth being of smaller sectional dimensions to accommodate shrinkage in the film and one pair of said teeth adapted to be moved away from the opposite pair after entering said film.

33. In mechanism for moving perforated film, a reciprocable shuttle, a vertically disposed vibratory pitman fulcrumed thereon and movable therewith, a crank engaging one end of said pitman adapted to vibrate the latter and raise and lower the same, an arm on said shuttle pivoted to move transversely thereto toward and away from the film, a horizontally disposed pair of teeth secured to said arm and movable therewith, a substantially T-shaped supporting member pivoted on said arm and capable of a rocking motion independent thereof, teeth projecting from the cross-piece of said member in vertical alinement with said first mentioned teeth, and a link pivotally carried by said member and having slotted engagement with the adjacent end of said pitman.

34. In mechanism for moving perforated film, a reciprocable shuttle, a vertically disposed vibratory pitman fulcrumed thereon and movable therewith, a crank engaging one end of said pitman adapted to vibrate the latter and raise and lower the same, an arm of said shuttle pivoted to move transversely thereto toward and away from the film, a horizontally disposed pair of teeth secured to said arm and movable therewith, a substantially T-shaped supporting member pivoted on said arm and capable of a rocking motion independent thereof, teeth projecting from the cross piece of said member in vertical alinement with said first mentioned teeth, and a link operatively connecting said member with the adjacent portion of said pitman.

35. In mechanism for moving perforated film, a reciprocable shuttle, a vertically disposed vibratory pitman fulcrumed thereon and movable therewith, a crank engaging one end of said pitman adapted to vibrate the latter and raise and lower the same, an arm on said shuttle pivoted to move transversely thereto toward and away from the film, a horizontally disposed pair of teeth secured to said arm and movable therewith, a substantially T-shaped supporting member pivoted on said arm and capable of a rocking motion independent thereof, teeth projecting from the cross piece of said member in vertical alinement with said first mentioned teeth, and a link pivoted at one end to said member and provided with a slot at its opposite end engaged by a pin on said pitman.

Signed at Chicago, Cook county, Illinois, this 11 day of February, 1915.

ALBERT S. HOWELL.

Witnesses:
E. K. LUNDY, Jr.,
WM. HAROLD EICHELMAN.